United States Patent [19]
Haas et al.

[11] 3,843,100
[45] Oct. 22, 1974

[54] METHOD AND APPARATUS FOR MIXING SOLIDS AND LIQUIDS

[75] Inventors: James Lynn Haas, Aliquippa, Pa.;
Paul A. Goodridge, Granville, Ohio

[73] Assignee: Owens-Corning Fiberglas Corporation, Toledo, Ohio

[22] Filed: July 13, 1972

[21] Appl. No.: 271,422

[52] U.S. Cl. .................................. 259/25, 259/9
[51] Int. Cl. ............................................ B01f 7/02
[58] Field of Search .............. 259/5, 6, 7, 9, 10, 25, 259/26, 45, 46

[56] References Cited
UNITED STATES PATENTS

| | | |
|---|---|---|
| 2,626,856 | 1/1953 | Alles .................................. 259/9 X |
| 2,994,914 | 8/1961 | Barta ................................. 259/7 X |
| 3,031,271 | 4/1962 | Weinbrenner et al. ............. 259/7 X |
| 3,163,403 | 12/1964 | Engels ................................. 259/9 |
| 3,259,374 | 7/1966 | Doebl et al. ......................... 259/10 |
| 3,734,471 | 5/1973 | Engels .............................. 259/10 X |

Primary Examiner—Robert W. Jenkins
Assistant Examiner—Philip R. Coe
Attorney, Agent, or Firm—Carl G. Staelin; John W. Overman; Allen D. Gutchess, Jr.

[57] ABSTRACT

A method and apparatus for mixing solid materials and liquids are provided. More specifically, such materials include particulate solids such as glass fibers and glass flakes, and foamable mixtures of two or more liquid components. The liquid components are first thoroughly mixed together before being mixed with the particulate solids. The mixed liquid is then supplied to a central zone and directed outwardly to the particulate solids in a zone surrounding the central one. After the solids and liquid are combined, this mixture is further mixed in a subsequent zone and then discharged to a location of use in a very short period of time, prior to the reaction and foaming of the liquid components.

12 Claims, 5 Drawing Figures

PATENTED OCT 22 1974   3,843,100

METHOD AND APPARATUS FOR MIXING SOLIDS AND LIQUIDS

This invention relates to a method and apparatus for mixing solids and liquids and more specifically for mixing particulate solids with mixed foamable liquid components.

Various solids can be mixed with foamable liquids to improve or alter the physical characteristics of the resulting foam. Specifically, by way of example, glass fibers or glass flakes can be mixed into the liquid components which form a urethane foam when mixed. Heretofore, in the combining of such solids and liquid components, it has been common practice to mix the solids into one of the foamable liquid components and then to combine that mixture of the liquid component and solids with the other liquid component. Using urethane foam and glass fibers for an example, the glass fibers have been mixed into a polyol component of the foam with this combination then subsequently mixed with an isocyanate and a blowing agent to form the foamable mixture with the additive therein.

According to the present invention, the particulate solids are mixed with the combined foamable components rather than with only one of them. This eliminates the problem of the one component with which the particulate solids are mixed tending to collect on the solids and never becoming thoroughly mixed with the other component with which it is intended to react. In that instance, the final mixture has a lesser reactive amount of the first ingredient, resulting in a waste of the one component and a heavier or more dense foam than would otherwise occur with proper mixing. By adding the particulate solids to the combined, mixed foamable liquid components, this will enable even the foamable mixture which is adhered to the particles to foam since the components are present in their proper proportions.

Also in accordance with the invention, the foamable liquid is supplied through a central zone which in a preferred form can be defined by a rotatable hollow shaft and is directed outwardly through openings in the shaft by centrifugal force as the shaft is rotated. The solids are supplied in an annular zone around the first central zone with the annular zone being established, in a preferred form, by a cylinder to which the solids are supplied near one end thereof. It has been found that by directing the liquid outwardly into the solids, more thorough mixing results than when the solids are mixed into the foamable liquid, which heretofore has resulted in balling or clumping of the particulate solid. The solid-liquid mixture is then more fully mixed in a paddle-type mixing section or zone and the mixture then discharged to the location of use.

The method and apparatus according to the invention also enable the solids and liquids to be mixed very quickly which renders the invention particularly suitable for foamable liquid components which begin to foam in a short period, e.g., sixty seconds, after the components are mixed. Further, even large quantities of the liquids and solids can be mixed in this short period of time.

It is, therefore, a principal object of the invention to provide a method and apparatus for mixing solids and liquids.

Another object of the invention is to provide a method and apparatus for mixing particulate solids with foamable liquid components after the components have been mixed together.

A further object of the invention is to provide a method and apparatus for mixing liquids into particulate solids.

Still another object of the invention is to provide a method and apparatus for mixing solids with foamable liquids which have a short reaction and foaming time.

Still a further object of the invention is to provide a method and apparatus for mixing particulate solids and foamable liquid in which the foamable liquid components are first mixed together and then supplied to a central zone from which they are directed outwardly to the particulate solids which are located in a second zone surrounding the central zone.

Many other objects and advantages of the invention will be apparent from the following detailed description of preferred embodiments thereof, reference being made to the accompanying drawings, in which.

Figure 1:
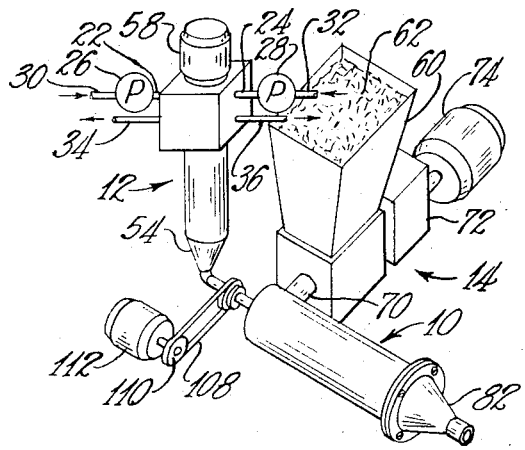
FIG. 1 is a somewhat schematic view in perspective of an overall system for mixing solids and liquids according to the invention.

Referring to the drawings and particularly to FIG. 1, a mixer embodying the invention is indicated at 10 and is supplied with liquid in a thoroughly mixed condition from apparatus indicated at 12. Also, particulate solids are supplied to the mixer 10 in a metered quantity by apparatus indicated at 14.

Figure 2:
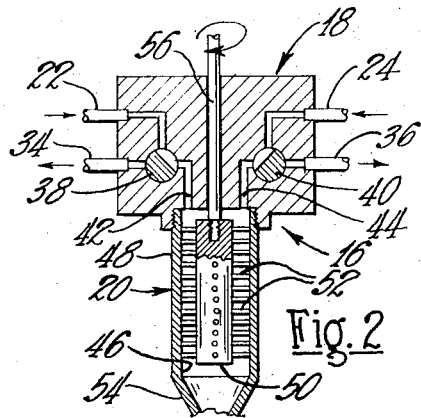
FIG. 2 is a somewhat schematic view in vertical cross section of apparatus for mixing together liquid components of a foamable liquid and for supplying the liquid to a mixer embodying the invention.
Figure 3:
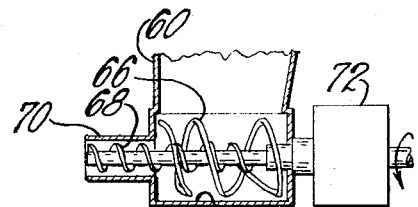
FIG. 3 is a fragmentary view in vertical cross section of apparatus for supplying a predetermined amount of particulate solid material to the mixer.
Figure 5:
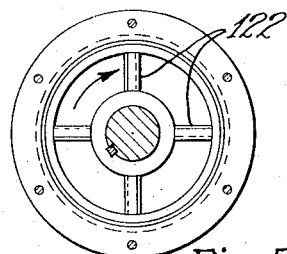
FIG. 5 is a view in transverse cross section taken along the lines 5—5 of FIG. 4.
Figure 4:
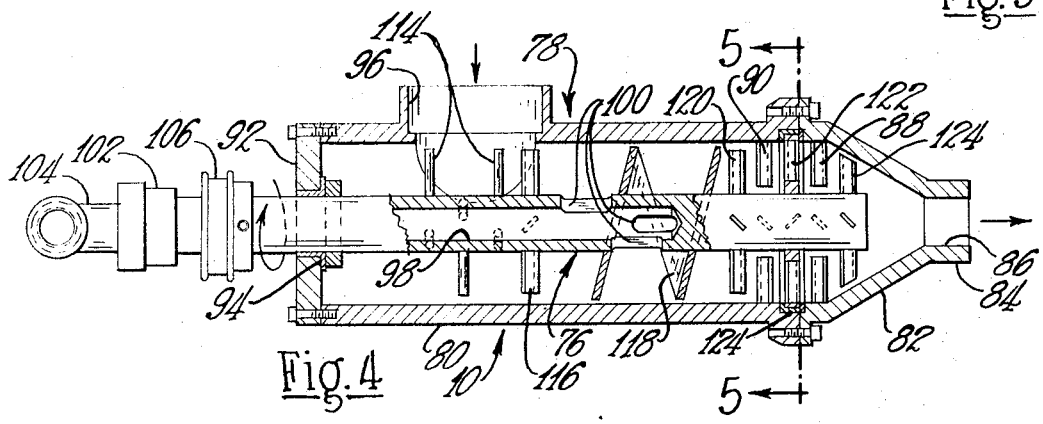
FIG. 4 is a view in longitudinal, horizontal cross section, with parts broken away and with parts in section, of apparatus for mixing together the liquid and particulate solids in accordance with the invention.

Referring also to FIG. 2, the liquid-supplying apparatus 12 includes a mixing device indicated at 16 having a valve body 18 and a mixing unit 20. Precisely metered, predetermined quantities of liquid components are supplied to the valve body 18 through lines 22 and 24 by precision volumetric control pumps 26 and 28. The pumps are driven by variable speed drives (not shown) which enable precise quantities of liquid components over a wide range to be supplied to the apparatus 16. The pumps are connected through recirculating lines 30, 32, and 34, 36 to suitable supply tanks (not shown) so that the liquid components can be continuously circulated if not supplied to the mixing unit 20. The valve body 18 includes control valves 38 and 40 for selectively recirculating the liquid components or supplying them to the mixing unit 20. The valve design can be in accordance with the disclosure in U.S. Pat. No. 3,098,506 and will not be discussed in further detail.

The two liquid components are supplied through passages 42 and 44 in the body 18 to a mixing chamber 46 formed by a housing 48 of the mixing unit 20. Within the chamber 46 is a rotatable hub 50 having a plurality of mixing vanes or paddles 52 extending therefrom. The vanes or paddles can be any of a number of suitable designs which are capable of quickly and thoroughly mixing the two liquid components in the chamber 46 by the time the liquid mixture reaches a discharge spout or cone 54. The hub is rotated by a drive shaft 56 which extends through the valve body 18 to a drive motor 58 located thereabove. Of course, various other apparatus can be employed in place of the specific liquid supplying apparatus 12, as long as a homogenous liquid of predetermined quantity is supplied to the discharge spout 54.

The particulate solids supply apparatus 14 includes a hopper 60 for holding a supply of the desired particulate solid material indicated at 62. The materials directed from the hopper 60 into a lower supply chamber 64 containing a large auger 66 and a small auger 68 which are independently driven. The large auger rotates slowly and prevents packing of the solid material in the hopper 60 and also maintains the solids at substantially uniform density around the smaller auger 68. The latter serves as a metering device which supplies a predetermined quantity of the solid material to a discharge pipe 70. The augers are mounted on separate shafts and driven at different speeds through a gear box 72 and a drive motor 74. The auger arrangement and overall supply apparatus 14 is disclosed more fully in U.S. Pat. No. 3,186,602 and will not be discussed in further detail.

The mixer 10 in accordance with the invention includes a central hollow shaft 76 establishing a first, central zone for the liquid to be mixed. A mixer housing 78 which encloses most of the shaft 76 establishes a second, annular zone for the solid material to be mixed. The housing 78 includes a substantially cylindrical portion 80 and a conical end portion 82 having a discharge spout 84 forming a small discharge opening 86. Two annular rows of stationary vanes 88 and 90 extend substantially radially-inwardly from the cylindrical wall 80 near the conical housing portion 82. The opposite end of the housing 78 has an end wall 92 which closes off that end of the housing and has a central bearing 94 which rotatably receives and supports the hollow shaft 76. A side entrance opening 96 in the cylindrical housing portion 80 constitutes a supply opening for the solid material to be mixed, this opening communicating with the discharge pipe 70 of the solid supply apparatus 14.

The hollow shaft 76 has a central passage 98 therein extending from one end of the shaft to a point upstream of the stationary vanes 88 and 90. The shaft has a plurality of discharge openings 100 spaced longitudinally therealong to direct outwardly the liquid from the passage 98. Rather than having the shaft openings 100 for the liquid extending over a substantial portion of the length of the shaft, all of the liquid can be discharged centrally into the mixer housing 78 nearer the end wall 92 to produce the desired mixing effect. This can be accomplished through a stationary distributor extending into the housing 78 through the end wall 92. The mixing vane and auger shaft can then be driven from outside the opposite end of the housing. The upstream end of the shaft 76 which is outside the housing 78 is connected with a rotary seal 102 which enables the shaft to communicate with a stationary elbow 104 attached to the lower end of the discharge cone 54 of the apparatus 12. Between the seal 102 and the end wall 92 of the mixer housing 78 is a pulley 106 which is suitably attached to the shaft 76 and rotates the shaft by means of a belt 108 (FIG. 1), a drive pulley 110, and a motor 112. The motor 112 preferably is of a variable speed type which enables the shaft 76 to be rotated through a precisely controlled range of speeds.

Within the housing 78, the shaft has a plurality of generally-radially extending elongate members or rods 114 which are located near the supply opening 96 for the solid material. These elongate members help to distribute the solid material from the opening 96 around the shaft 76 and into an annular zone formed between by the housing 78 and the shaft. The shaft 76 also has a row of vanes or paddles 116 which are positioned to mix the solid material and to direct it toward the discharge opening 86. In this area, the liquid begins to be directed outwardly into the annular zone of the solid material where they mix. The initial and subsequent mixtures of the liquids and solids are moved along the annular zone toward the discharge opening 86 by an auger blade 118 which also serves to further mix the liquids and solids. Immediately beyond the annular zone and the auger blade 118 is a mixing zone including an additional row of paddles or vanes 120 located between the auger blade 118 and the stationary vanes 90. Between the two rows of the stationary vanes 88 and 90 is a second row of blades 122 affixed to the shaft 76 and extending outwardly to an annular bearing ring 124 located in the cylindrical housing portion 80 and serving to rotatably support the downstream end of the hollow shaft 76. A third row of shorter paddles 124 is then located beyond the last stationary vanes 88 at the end of the mixing zone. At this point, the liquids and solids are thoroughly mixed and are forced outwardly through the discharge opening 86.

The elongate mixing members used on the shaft 76 and in the housing portion 80 can be of a variety of designs. However, it is desirable that they be effective to distribute the solid material around the shaft 76, to move the material and liquid toward the discharge opening, and further to mix the liquids and solids before being discharged.

The mixing system according to the invention has a number of advantages. First, when multi-component liquids are to be combined with a solid material, the components are first thoroughly mixed together before being mixed with the solid material. Consequently, even if the subsequent liquid-solid mixture has a concentration of the liquid on particles of the solid material, nevertheless this liquid will be fully mixed and will still function the same as the rest of the liquid. In the case of urethane foam, for example, heretofore, the solid particles would be mixed with the polyol with this combination subsequently mixed with an isocyanate and a blowing agent to form the final foamable reinforced mixture. In such an instance, the polyol would tend to wet the solid particles and be concentrated thereon or nearby. Consequently, a lesser reactive amount of the one ingredient, specifically the polyol, would result, and foaming would not be effected to the extent possible with proper mixing. Consequently a heavier foam and waste of a portion of the foaming materials would result. By further mixing the liquid components first, however, they react fully and effectively even if some portions are concentrated on the solid particles to a greater extent than other portions of the final mixture.

Second, the mixing system according to the invention directs the liquid outwardly from the central zone into the annular zone of the solid particulate material. This technique has been found to be effective in mixing the two without causing balling or clumping of the solid particles, which has heretofore tended to occur when such materials have been mixed or have tried to be mixed. This appears to be particularly effective when the solid particulates have a lower bulk density than the liquid foamable mixture. However, this technique has been found to function well regardless of the densities or apparent densities of the liquids and solids.

Third, the mixing system according to the invention enables the foamable liquids to be mixed together and then mixed with the solid particles in a very short period of time. This is particularly important with foamable liquids which may begin to foam within sixty seconds or less after mixing. In the mixing system of FIG. 1, the foamable liquid can move from the stationary elbow 104 to the discharge opening 86 in about two seconds. Further, the mixer can be designed in a large range of sizes and speeds to produce an output over a wide range to meet varying requirements.

Various modifications of the above described embodiment of the invention will be apparent to those skilled in the art, and it is to be understood that such modifications can be made without departing from the scope of the invention, if they are within the spirit and tenor of the accompanying claims.

We claim:

1. A method of mixing particulate solid material with liquid components which, when mixed together, form a foamable mixture, said method comprising mixing the foamable liquid components together, subsequently supplying the mixed liquid to a first, central zone, supplying the particulate solid material to a second zone surrounding the first zone, directing the mixed liquid outwardly from the first zone toward the second zone, and mixing together the solid material and the mixed liquid.

2. A method according to claim 1 characterized by mixing together the particulate solid material and the mixed liquid at a location beyond the location where the mixed liquid is directed outwardly.

3. A method according to claim 1 characterized by rotating the liquid in the first zone prior to directing it outwardly.

4. A method according to claim 1 characterized by directing the mixed liquid outwardly from several locations at the first zone toward the second zone.

5. A method of mixing solid particles with liquid which comprises two liquid components, said method comprising mixing together said liquid components, subsequently supplying the mixed liquid to a central zone, supplying the particles to a second, annular zone surrounding the first zone, directing the mixed liquid outwardly from the first zone to the solid particles in the second zone, moving the mixed liquid and solid particles along the second zone, and mixing together the particles and the mixed liquid.

6. A method according to claim 5 characterized by said liquid components producing a foam a period of time after being mixed together, and mixing together the particles and mixed liquid prior to initiation of foaming by the liquid mixed.

7. A method according to claim 5 characterized by directing the mixed liquid outwardly from the first zone to the solid particles in the second zone at a plurality of locations spaced along the first zone.

8. A method according to claim 7 characterized by rotating the mixed liquid in the first zone and directing the mixed liquid outwardly by centrifugal force.

9. Apparatus for mixing a foamable liquid comprising two liquid components with particulate solid material, said apparatus comprising a hollow shaft forming a central zone, means for rotating said hollow shaft, means for mixing together the liquid components and for supplying mixed liquid to said central zone, means forming an annular zone around the central zone, means for supplying the particulate solid material to said annular zone, means associated with the hollow shaft for directing mixed liquid in said central zone outwardly toward said annular zone, and auger means mounted on said shaft in said annular zone for moving the mixed liquid and the particulate solid material along the annular zone after they are brought together at the annular zone.

10. Apparatus according to claim 9 characterized further by additional means for mixing the mixed liquid and the particulate solid material after being brought together at the annular zone.

11. Apparatus according to claim 9 characterized by said central zone formed by said hollow shaft is elongate and extends through at least a substantial portion of said annular zone.

12. Apparatus according to claim 11 characterized by said directing means directs mixed liquid in said central zone toward said annular zone from a plurality of locations spaced along said hollow shaft.

* * * * *